US008930569B2

(12) United States Patent
Nagaraj

(10) Patent No.: US 8,930,569 B2
(45) Date of Patent: Jan. 6, 2015

(54) METHODS AND APPARATUS FOR OPTIMUM FILE TRANSFERS IN A TIME-VARYING NETWORK EMVIRONMENT

(75) Inventor: Thadi M. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1678 days.

(21) Appl. No.: 11/120,583

(22) Filed: May 2, 2005

(65) Prior Publication Data

US 2006/0026296 A1 Feb. 2, 2006

Related U.S. Application Data

(60) Provisional application No. 60/568,161, filed on May 5, 2004.

(51) Int. Cl.
| | | |
|---|---|---|
| *G06F 15/16* | (2006.01) | |
| *H04L 1/00* | (2006.01) | |
| *H04L 1/16* | (2006.01) | |
| *H04L 1/18* | (2006.01) | |
| *H04L 12/801* | (2013.01) | |
| *H04L 12/825* | (2013.01) | |

(52) U.S. Cl.
CPC ............ *H01L 1/1628* (2013.01); *H04L 1/0002* (2013.01); *H04L 1/0034* (2013.01); *H04L 1/16* (2013.01); *H01L 1/188* (2013.01); *H04L 1/1887* (2013.01); *H04L 47/10* (2013.01); *H04L 47/25* (2013.01); *H01L 67/06* (2013.01); *Y02B 60/31* (2013.01)
USPC ........................................................ 709/233

(58) Field of Classification Search
CPC ........................................................ H04L 47/10
USPC ................................................................ 709/233
See application file for complete search history.

(56) References Cited

U.S. PATENT DOCUMENTS

| | | | |
|---|---|---|---|
| 6,587,875 B1 * | 7/2003 | Ogus | 709/223 |
| 7,058,723 B2 * | 6/2006 | Wilson | 709/235 |
| 7,085,227 B1 * | 8/2006 | Brooks et al. | 370/229 |
| 7,310,682 B2 * | 12/2007 | Hatime | 709/233 |
| 7,573,886 B1 * | 8/2009 | Ono | 370/395.2 |
| 7,925,775 B2 * | 4/2011 | Nishida | 709/232 |
| 2001/0032269 A1 * | 10/2001 | Wilson | 709/235 |
| 2002/0044528 A1 * | 4/2002 | Pogrebinsky et al. | 370/230 |
| 2002/0150048 A1 | 10/2002 | Ha et al. | 370/231 |
| 2003/0009560 A1 * | 1/2003 | Venkitaraman et al. | 709/226 |
| 2003/0023746 A1 * | 1/2003 | Loguinov | 709/235 |
| 2003/0206524 A1 | 11/2003 | Mohanty et al. | 370/236 |
| 2005/0027948 A1 * | 2/2005 | Marlan et al. | 711/150 |

(Continued)

OTHER PUBLICATIONS

International Search Report and Written Opinion PCT/US05/015907 International Search Authority—European Patent Office Jan. 9, 2005.

*Primary Examiner* — Bryan Lee
(74) *Attorney, Agent, or Firm* — The Marbury Law Group, PLLC

(57) ABSTRACT

Methods and apparatus for optimum file transfers in a time-varying network environment. A method is provided for transmitting content in a data network. The method includes transmitting content at a selected transmission rate, and receiving one or more acknowledgement signals. The method also includes estimating a network delivery rate from the one or more acknowledgment signals, and adjusting the selected transmission rate of the content based on the network delivery rate.

43 Claims, 6 Drawing Sheets

(56) References Cited

U.S. PATENT DOCUMENTS

| | | |
|---|---|---|
| 2005/0028948 A1 | 2/2005 | Austin |
| 2005/0073960 A1* | 4/2005 | Oura et al. .................... 370/252 |
| 2008/0144509 A1* | 6/2008 | Chan et al. .................... 370/235 |

* cited by examiner

METHODS AND APPARATUS FOR OPTIMUM FILE TRANSFERS IN A TIME-VARYING NETWORK EMVIRONMENT

CLAIM OF PRIORITY UNDER 35 U.S.C. §119

The present application claims the benefit of priority from a co-pending U.S. Provisional Application entitled, "METHOD FOR OPTIMAL FILE TRANSFERS IN A TIME-VARYING WIRELESS CHANNEL" having application Ser. No. 60/568,161 and filed on May 5, 2004, the disclosure of which is incorporated herein in its entirety for all purposes.

BACKGROUND

I. Field

The present invention relates generally to content delivery in network environments, and more particularly, to methods and apparatus for optimum file transfers in time-varying network environments.

II. Description of the Related Art

The distribution of content (data) to a large number of terminals (subscribers) in a wireless network is a complicated problem. For example, wireless networks cover large geographic regions, and the type of network coverage and/or available services may be different for each region. Therefore, delivering content to mobile devices that are moving from region to region requires an efficient delivery system that conserves network resources while providing device users with the content they desire.

Multi-user diversity is an important factor in wireless data networks. Typically, such diversity is used to achieve better spectral efficiency. However, from an application layer point of view, the results of such diversity may be inherent variability in the data rates allocated to users in such a network. Congestion control schemes typically used in the transport control protocol (TCP) were designed for wired networks. However, the loss and variability of a wireless channel causes the TCP protocol to re-transmit content frequently and thus waste bandwidth.

Typically, a conventional system attempts to solve this problem by making small changes to the TCP protocol in an attempt to handle loss and variability. However, the underlying Windows-based flow control scheme is flawed in such a time-varying environment and cannot make significant performance improvements.

Therefore, what is needed is a system that provides efficient file transfers in a time-varying wireless network. The system should operate to provide an adaptive rate-based protocol that controls the re-transmission of content so that network resources and bandwidth are conserved.

SUMMARY

In one or more embodiments, a file transfer system, comprising methods and apparatus, is provided that operates to allow content to be efficiently delivered in a time-varying network environment. In one embodiment, the system comprises logic at a transmitting server that operates to control the rate at which content is transmitted based on a rate estimation derived from previous transmissions. The system is especially well suited for use in wireless networks where the transmission channel may vary over time resulting in delivery delays and packet loss.

In one embodiment, a method is provided for transmitting content in a data network. The method comprises transmitting content at a selected transmission rate, and receiving one or more acknowledgement signals. The method also comprises estimating a network delivery rate from the one or more acknowledgment signals, and adjusting the selected transmission rate of the content based on the network delivery rate.

In one embodiment, an apparatus for transmitting content in a data network is provided. The apparatus comprises transceiver logic configured to transmit content at a selected transmission rate and receive one or more acknowledgement signals, and estimator logic configured to estimate a network delivery rate from the one or more acknowledgment signals. The apparatus also comprises rate controller logic configured to adjust the selected transmission rate of the content based on the network delivery rate In one embodiment, apparatus for transmitting content in a data network in a data network is provided. The apparatus comprises means for transmitting content at a selected transmission rate, and means for receiving one or more acknowledgement signals. The apparatus also comprises means for estimating a network delivery rate from the one or more acknowledgment signals, and means for adjusting the selected transmission rate of the content based on the network delivery rate.

In one embodiment, a computer-readable media is provided that comprises instructions, which when executed by a processor, operate to transmit content in a wireless data network. The computer-readable media comprises instructions for transmitting content at a selected transmission rate, and instructions for receiving one or more acknowledgement signals. The computer-readable media also comprises instructions for estimating a network delivery rate from the one or more acknowledgment signals, and instructions for adjusting the selected transmission rate of the content based on the network delivery rate.

Other aspects, advantages, and features of the present invention will become apparent after review of the hereinafter set forth Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of a file transfer system that operates to allow a server to efficiently deliver content in a data network. The system is especially well suited for use in wireless networks environments, but may be used in any type of network environment, including but not limited to, communication networks, public networks, such as the Internet, private networks, such as virtual private networks (VPN), local area networks, wide area networks, long haul network, or any other type of data network.

Figure 1:
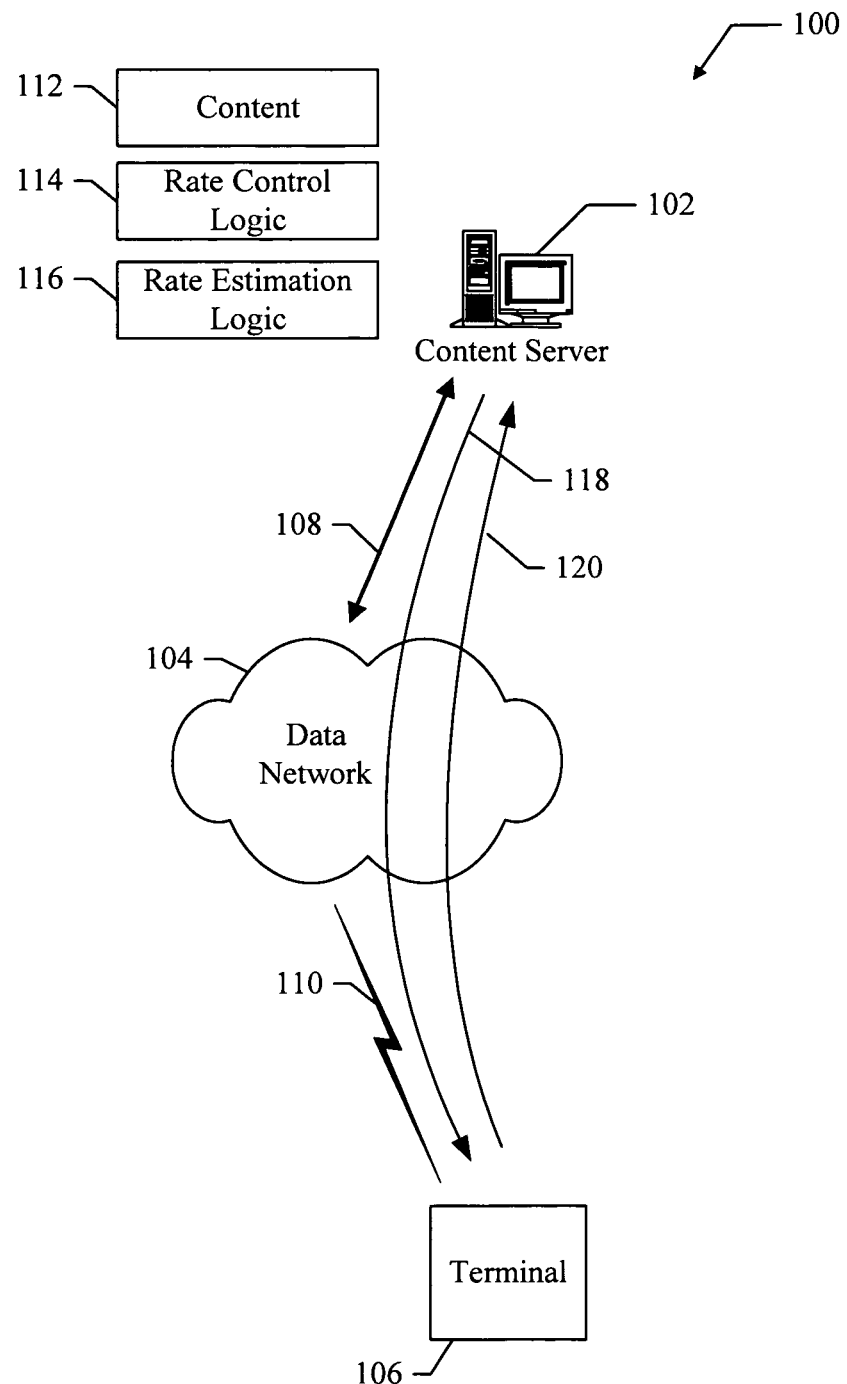
FIG. 1 shows a data network that comprises one embodiment of a file transfer system.

FIG. 1 shows a data network 100 that comprises one embodiment of a file transfer system. The network 100 comprises a content server 102, a data network 104, and a mobile terminal 106. The data network 104 may be any type and/or combination of wired and/or wireless networks that allow data to be transmitted between the server 102 and the terminal 106. The server 102 communicates with the network 104 via the communication link 108. The communication link 108 may be any type of wired or wireless communication link that allows the server 102 to communicate with the data network 104.

The server 102 comprises content 112, rate control logic 114, and rate estimation logic 116. The content 112 comprises any type of program, data, multimedia file, script, or any other type of content file that is to be transferred or delivered to the terminal 106 via the network 104.

In one embodiment, the data network 104 comprises a high-speed data network that is capable of efficiently transmitting content to a mobile terminal via a wireless communication link 110. In one embodiment, the wireless communication link 110 comprises a forward communication channel, reverse communication channel, control channels, and/or any other type of communication channel that may be used to communicate information between the network 104 and the terminal 106.

The terminal 108 comprises any type of mobile device or terminal, such as, a mobile telephone, portable computer, personal digital assistant (PDA), or any other type of portable device capable of receiving content over the wireless communication link 110. During operation, the file transfer system operates to allow the server 102 to efficiently transmit the content 112 to the terminal 106 via the network 104. In one embodiment, the content 112 comprises a sequence of data packets where each packet has an associated unique packet identifier (ID). The packet identifiers assigned to the content packets have a pre-determined sequence. The server 102 operates to transmit the content 112 packet by packet to the terminal 106, as shown by path 118. The server 102 transmits the content 112 at an initial transmission rate that is supported by the data network 104. For example, in one embodiment the initial transmission rate is approximately 600 bits per second.

Once the terminal 106 begins to receive the packets of content, the terminal 106 responds by transmitting acknowledgment signals back to the server 102, as shown by path 120. In one embodiment, the acknowledgment signals comprise a positive acknowledgement (Ack) signal and a negative acknowledgement (Nack) signal. A positive acknowledgement indicates that a packet was properly received at the terminal 106 and a negative acknowledgment indicates that a packet was not properly received. For example, if the terminal 106 receives one or more packets, it transmits one or more Acks back to the server 102 to acknowledge the receipt of those packets. However, in one embodiment, the terminal 106 uses the received packet IDs to determine that one or more packets have not been received. For example, the packets have sequential IDs and the terminal 106 uses the received packet IDs to make a determination that one or more packets have not been received. As a result, the terminal 106 operates to transmit one or more Nacks to the server 102 to indicate which packets have not been received. Upon the receipt of one or more Nack signals, the server 102 operates to re-transmit the un-received packets. In one embodiment, the Acks and Nacks may be of any format or type suitable for transmission to the server 102 to indicate that one or more packets have or have not been received, and to identify those packets.

When the Acks and Nacks are received at the server 102, the rate estimation logic 116 operates to determine the rate at which the network is delivering packets. For example, the number of Acks received in a given time period is one factor that the rate estimation logic 116 may use to determine the rate at which the network is successfully delivering packets. The rate at which the network delivers packets may be affected by such network conditions or characteristics as lossy connections, network congestion, signal fading, interference and/or any other type of condition or characteristic that may affect network performance.

Once the rate estimation logic 116 determines an estimate of the network performance due to the current network conditions or characteristics, the rate control logic 114 operates to use the rate estimate to control the rate of future packet transmissions. For example, if the rate estimate indicates that the network is losing many packets (i.e., due to signal fading) then the rate control logic operates to reduce the transmission rate of the packets. The same is true in the reverse circumstance, so that if the rate estimate indicates that the network is successfully delivering packets, then the rate control logic operates to increase the transmission rate of the packets. As a result, the system operates to produce highly efficient file transfers over the data network given the current network conditions and transmission environment.

Thus, in one or more embodiments, the file transfer system operates to transmit content to a terminal via a wireless network, determine estimates of the delivery performance of the network, and adjust the transmission rate of the content based on the estimates to provide the most efficient transmission of the content.

Figure 2:
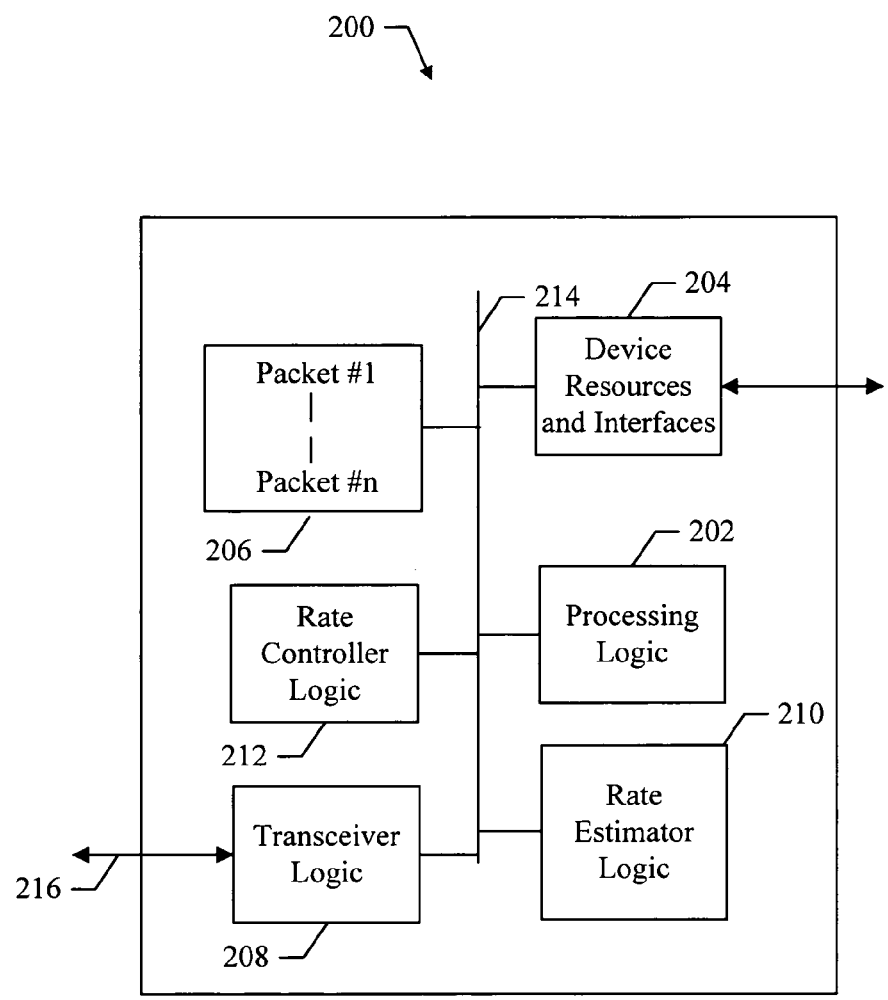
FIG. 2 shows a detailed diagram of one embodiment of a server suitable for use in one embodiment of a file transfer system.

FIG. 2 shows a detailed diagram of one embodiment of a server 200 suitable for use in one embodiment of a file transfer system. For example, the server 200 may be used as the content server 102 in FIG. 1. The server 200 comprises processing logic 202, device resources and interfaces 204, content 206, and transceiver logic 208, all coupled to an internal data bus 214. The server 200 also comprises rate estimator logic 210 and rate controller logic 212, which are also coupled to the data bus 214.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and/or to control one or more other functional elements of the server 200 via the internal data bus 214.

The device resources and interfaces 204 comprise hardware and/or software that allow the server 200 to communicate with internal and external systems. For example, internal systems may include mass storage systems, memory, display driver, modem, or other internal device resources. The external systems may include user interface devices, printers, disk drives, or other local devices or systems.

The content 206 comprises any type of program, data, file, script, multimedia file or other type of content that may be downloaded to a mobile terminal. In one embodiment, the content 206 comprises a set of packets (1–n) where each packet has an associated unique packet identifier (ID). For example, in one embodiment, the packets are assigned unique packet identifiers that comprise a pre-defined sequence of numbers. In one or more embodiments, the packet identifiers may comprise identifiers of any type and/or format that allow the packets of the content 206 to be uniquely identified.

The transceiver logic 208 comprises hardware and/or software that operates to allow the server 200 to transmit and receive data and/or other information with remote devices, systems or networks via communication channel 216. For example, in one embodiment, the communication channel 216 comprises any type of wired or wireless communication channel that may be used to communicate with a data network, such as the network 104.

The rate estimator logic 210 comprises a CPU, processor, gate array, hardware logic, memory elements, virtual machine, software, and/or any combination of hardware and software. The rate estimator logic 210 operates to determine an estimate of how successful a network is delivering the content to a remote device. For example, as the server 200 transmits the content packets 206 to the remote device, the device responds with Acks and/or Nacks as necessary to indicate whether or not the packets are being successfully received. The rate estimator logic 210 processes the received Acks and Nacks to determine a rate estimation value that indicates the delivery rate being provided by the network connection to the remote device. For example, the number of Acks received over a given transmission duration can be used to make an estimate of the delivery rate being provided by the network connection to the remote device. A more detailed description of the operation of the rate estimator logic 210 is provided in another section of this document.

The rate controller logic 212 comprises a CPU, processor, gate array, hardware logic, memory elements, virtual machine, software, and/or any combination of hardware and software. The rate controller logic 212 operates to process the rate estimation to adjust the rate at which packets are transmitted from the server 200 to the remote device.

During operation of the server 200, the transceiver logic 208 operates to transmit packets of the content 206 to a remote device and receive Acks and Nacks transmitted from the remote device in response to the packet transmission. The rate estimator logic 210 processes the received Acks and Nacks to determine a rate estimation that indicates how well the network channel is delivering the packets to the remote device. The rate controller logic 212 operates to adjust the transmission rate of the packets based on the rate estimation determined by the rate estimator logic 210. Thus, the transmission rate of the packets may be maintained, increased or decreased depending on how well the data network and associated communication channel to the remote device is performing. As a result, the transmission rate of the content is adjusted based on the current network conditions to delivered the content to the remote device in a very efficient manner.

In one embodiment, the processing logic 202 operates to process the received Acks/Nacks to re-transmit selected content packets 206 that have not been received by the remote terminal. In another embodiment, the processing logic 202 comprises timing logic that is used to measure a response interval after a packet is transmitted. If no response is received from the remote terminal with the response interval, the processing logic 202 operates to re-transmit the packet.

In one embodiment, the file transfer system comprises program instructions stored on a computer-readable media, which when executed by the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200 via the device resources 204. In another embodiment, the instructions may be downloaded into the server 200 from a network resource that interfaces to the sever 200 via the transceiver logic 208. The instructions, when executed by the processing logic 202, provide one or more embodiments of a file delivery system as described herein.

Rate Estimation

The following section provides a more detailed description of the operation of one embodiment of the rate estimator logic 210. It should be noted that other rate estimation techniques might be used within the scope of the embodiments.

Assuming that N(n) indicates the number of un-acknowledged packets at estimation time n, and R(n) is the estimated rate at time n. Then the following expression for N(n) may be defined;

$$N(n)=N(n-1)+(R(n-1)-R')*T/S$$

where R' is the network delivery rate, T is the estimation duration, and S is the size of the packet.

The number of un-acknowledged packets at time n will be equal to the number un-acknowledged at (n−1) plus the number of packets sent in the meantime minus the number of packets acknowledged by the receiving terminal. Thus, using the above equation yields:

$$R(n)=R(n-1)+[N(n)-N(n-1)]*S/T$$

which is used by the rate estimation logic 210 to estimate the delivery rate being provided by the network. If the server's rate estimate is small compared to the network rate, then the number of un-acknowledged packets will be small. In this case, the rate estimation equation becomes:

$$R(n)=2*R(n-1)$$

In one embodiment, the estimation duration T is may be preferably chosen to achieve a desired performance level of the estimation logic. For example, if T is chosen to be large, then the server may not track the network rate changes accurately enough. If T is chosen too small, the R(n) may become negative. To avoid the above conditions, in one embodiment, T is chosen to be large enough to provide efficient performance over the network.

Figure 3:
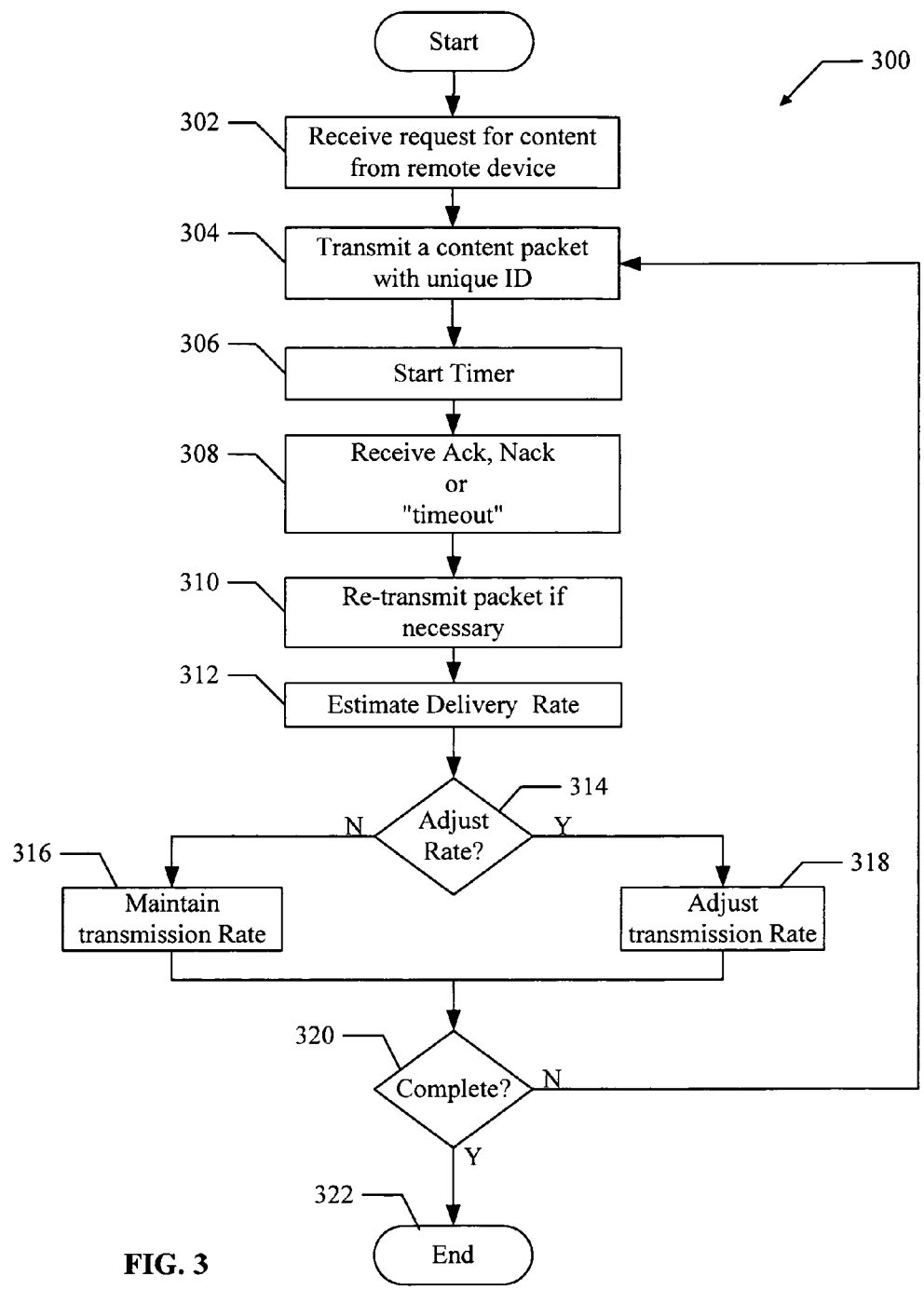
FIG. 3 shows one embodiment of a method for operating a server in one embodiment of a file transfer system.

FIG. 3 shows one embodiment of a method 300 for operating a server in one embodiment of a file transfer system. For clarity, the method 300 will be described with reference to the server 200 shown in FIG. 2. In one or more embodiments, the processing logic 202 executes program instructions to perform the functions described below.

At block 302, the server receives a request for content from a remote device or terminal. For example, in one embodiment, the server is coupled to a data network that is in communication with one or more terminals. At least one terminal on the network sends a request for content to the server. For example, in one embodiment, the request is received at the transceiver logic 208 and forwarded to the processing logic 202 for further processing.

At block 304, the server begins transmission of content to the requesting device. For example, the content comprises content packets that include unique identifiers, and the server transmits one or more content packets to the requesting device via the transceiver logic 208. The transceiver logic 208 transmits the packets at an initial transmission rate that is known by the rate controller logic 212.

At block 306, a timer is activated to measure a response time period. For example, in one embodiment, the timer is part of the processing logic 202. The response time period defines a time interval within which the server should receive an Ack response from the terminal to indicate that a packet has been received. The time interval may be set to any suitable value.

At block 308, the server receives one or more Acks and/or Nacks from the remote device. For example, when the remote device begins to receive the content packets, the remote device operates to transmit Acks and Nacks as necessary. For example, the remote device uses the unique identifiers associated with the received content packets to determine whether or not content packets are being successfully received. In one embodiment, the Acks and Nacks are received at the server by the transceiver logic 208. Alternatively, the timer (activated at block 306) indicates that a "timeout" has occurred before any Ack or Nacks are received.

At block 310, the server re-transmits content packets to the device as determined from the received Nacks, or as the result of a timeout. For example, the server receives one or more Nacks from the remote device indicating that the device has not received one or more content packets. Based on the received Nacks, the server re-transmits selected packets as necessary via the transceiver logic 208. Alternatively, the server re-transmits one or more packets as a result of a timeout condition. A more detailed description of the re-transmission process is provided in another section of this document.

At block 312, an estimate of the current delivery rate of the data network is determined. In one embodiment, the estimator logic 210 processes the received Acks and/or Nacks to determine the estimate of the current network delivery rate. For example, the network delivery rate indicates the rate at which the network is delivering packets to the terminal. In one embodiment, the estimate of the delivery rate is performed as described above.

At block 314, a test is performed to determine if the server's transmission rate of the content packets needs to be adjusted based on the determined network delivery rate. For example, the rate controller logic 212 uses the estimate of the current network delivery rate determined by the estimator logic 210 to determine whether or not the transmission rate of the content packets should be adjusted. For example, the estimate of the network delivery rate is compared to the current packet transmission rate by the rate controller logic 212. If the current transmission rate is to be maintained, the method proceeds to block 316. If the current transmission rate is to be adjusted, the method proceeds to block 318.

At block 316, the transmission rate of the content packets is maintained. For example, the rate controller logic 212 has determined that that current transmission rate provides a selected level of performance based on the current delivery rate of the data network, and so no adjustments to the transmission rate are required. For example, the controller logic 212 determines that the current transmission rate is providing the best transmission performance based on the determined network delivery rate.

At block 318, the transmission rate of the content packets is adjusted based on the determined network delivery rate. For example, the rate controller logic 212 has determined that based on the determined network delivery rate the transmission rate of the content packets can be adjusted to improve performance. In one embodiment, the rate controller logic 212 adjusts the transmission rate by controlling the transceiver logic 208 to either increase or decrease the transmission rate of the content packets as necessary. For example, in one embodiment, if the determined delivery rate is lower than the current transmission rate, the controller logic 212 operates to decrease the transmission rate. Alternatively, if the determined delivery rate is very high and/or substantially the same as the transmission rate, the controller logic 212 operates to increase the transmission rate to determine if the network can support a higher transmission rate. Thus, the controller logic 212 operates to seek the highest transmission rate possible to achieve a desired network delivery rate.

At block 320, a test is performed to determine if the content transmission is complete. For example, the processing logic 202 determines if all the packets of the content have been successfully transmitted to the remote device. If the transmission is complete, the method ends at block 322. If the transmission is not complete, the method proceeds to block 304 where the processing logic 202 operates to control the transceiver logic 208 to transmit the content packets to the remote device using a transmission rate that reflects any adjustments made at block 318.

It should be noted that the method 300 illustrates just one embodiment and that changes, additions, or rearrangements of the functional elements may be made without deviating from the scope of the described embodiments. For example, the estimate of the current network delivery rate determined at block 312 may be performed at selected random or periodic intervals, or in response to a selected trigger event.

Packet Re-Transmission

The following text describes how in one embodiment of a file transfer system, a server operates to re-transmit content packets to a remote device. As described with reference to the method 300 of FIG. 3, re-transmission of content packets may occur as the result of one or more of the following conditions.
1. One or more Nacks are received that identify the same content packet.
2. A timeout occurs when no response is received after a packet is transmitted.

With regard to packet re-transmission based on received Nacks, in one embodiment, the server waits to receive one or more Nacks that identify the same content packet before re-transmitting that content packet. For example, server may re-transmit a packet based on receiving only one Nack from a remote terminal. In another embodiment, the server waits to receive multiple Nacks before re-transmitting a content packet. For example, the receiving terminal sends Ack/Nack responses to the server as packets are received. If a packet has not been received, the receiving terminal will repeat the Nack response for that packet in every subsequent Ack/Nack transmission. Thus, the server will continue to receive Nack responses for a missing packet. After the server receives a selected number of Nack responses for a packet (i.e., three Nack responses), the server then re-transmits the content packet. Therefore, the server is able to provide an opportunity for a missing packet to arrive at the receiver before re-transmitting the packet.

With regard to packet re-transmission based on a timeout condition, the server operates to re-transmit a content packet if an Ack/Nack signal is not received within a selected time interval. For example, the processing logic 202 comprises timing logic that measures a selected time interval after transmission of a content packet. If an Ack/Nack for the packet is not received before the end of the selected time interval, then the processing logic 202 operates to re-transmit the packet using the transceiver logic 208. Thus, the system operates to re-transmit content packets without input from a remote device.

Figure 4:
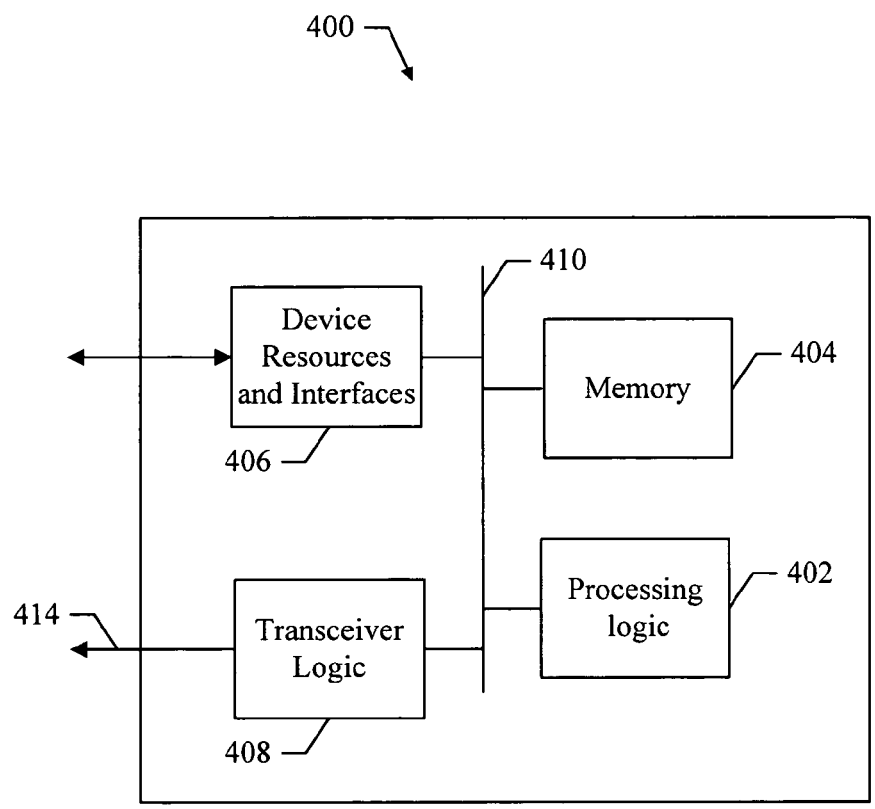
FIG. 4 shows a detailed diagram of one embodiment of a mobile terminal suitable for use in one embodiment of a file transfer system.

FIG. 4 shows a detailed diagram of one embodiment of a terminal 400 suitable for use in one embodiment of a file transfer system. The terminal 400 comprises processing logic 402, memory 404, device resources and interfaces 406, transceiver logic 408, all coupled to a data bus 410.

In one or more embodiments, the processing logic 402 comprises a CPU, processor, gate array, hardware logic, memory elements, virtual machine, software, and/or any combination of hardware and software. Thus, the processing logic 402 generally comprises logic to execute machine-readable instructions, and to control one or more other functional elements of the terminal 400 via the internal data bus 410.

The device resources and interfaces 406 comprise hardware and/or software that allow the terminal 400 to communicate with internal and external systems. For example, internal systems may include mass storage systems, memory, display driver, modem, or other internal device resources. The external systems may include user interface devices, printers, disk drives, or other local devices or systems.

The transceiver logic 408 comprises hardware and/or software that operates to allow the terminal 400 to transmit and receive data and/or other information with external devices or systems via communication channel 414. For example, in one embodiment, the communication channel 414 comprises a forward channel, reverse channel, and a control channel that operates to allow the terminal 400 to communicate with a data network over the communication channel 414.

The memory 404 comprises any type of memory suitable for storing information at the terminal 400. For example, the terminal 400 may operate to download content and store the received content in the memory 404 for further processing.

During operation of the terminal 400, content may be downloaded from a server in accordance with one or more embodiments of a file transfer system. The content is downloaded in the form of content packets, where each packet has a unique packet identifier, and where all the packet identifiers have a pre-defined sequence. Thus, the receipt of one or more content packets having selected packet identifiers can be used to determine whether or not other content packets having other selected identifiers have been received.

In one embodiment, the processing logic 402 operates to cause Acks and Nack to be transmitted by the transceiver logic 408 to a content server in response to the received content packets. For example, the processing logic 402 causes an Ack signal to be transmitted for every received content packet. The Ack signal comprises any suitable type of acknowledgment signal that may be sent from the terminal 400 to the transmitting server. The processing logic 402 also causes a Nack signal to be transmitted to the transmitting server for content packets that are not received. In one embodiment, the processing logic 402 processes the unique packet identifiers associated with received content packets to determine which content packets have not been received. For example, the packet identifiers have a pre-defined sequence so that if a selected packet identifier has been received, then packet identifiers earlier in the sequence should also have been received. As a result, the processing logic 402 generates a Nack signal that is transmitted to the server to identify any packets that have not been received.

In one or more embodiments of a file transfer system, the terminal 400 operates to download content by performing one or more of the following functions.
1. The terminal request content from a content server on a data network.
2. The content server begins the transmission of content to the terminal by transmitting content packets to the terminal, where each content packet has a unique identifier.
3. The terminal operates to determine which content packets are received and which are not received by processing the received packet identifiers.
4. The terminal operates to transmit Acks and/or Nacks to the server in response to received and not received content packets.
5. The terminal continues to receive new content packets and re-transmitted content packets until the entire content file is received. During this process, the terminal continues to transmit Acks and/or Nacks as necessary.

In one embodiment, the file transfer system comprises program instructions stored on a computer-readable media, which when executed by the processing logic 402, provides the functions of the terminal 400 described herein. For example, instructions may be loaded into the terminal 400 from a computer-readable media, such as a floppy disk, CDROM, memory card, FLASH memory device, RAM, ROM, or any other type of memory device or computer-readable media that interfaces to the terminal 400 via the device resources 406. In another embodiment, the instructions may be downloaded into the terminal 400 from a network resource that interfaces to the terminal 400 via the transceiver logic 408. The instructions, when executed by the processing logic 402, provide one or more embodiments of a file transfer system as described herein.

Figure 5:
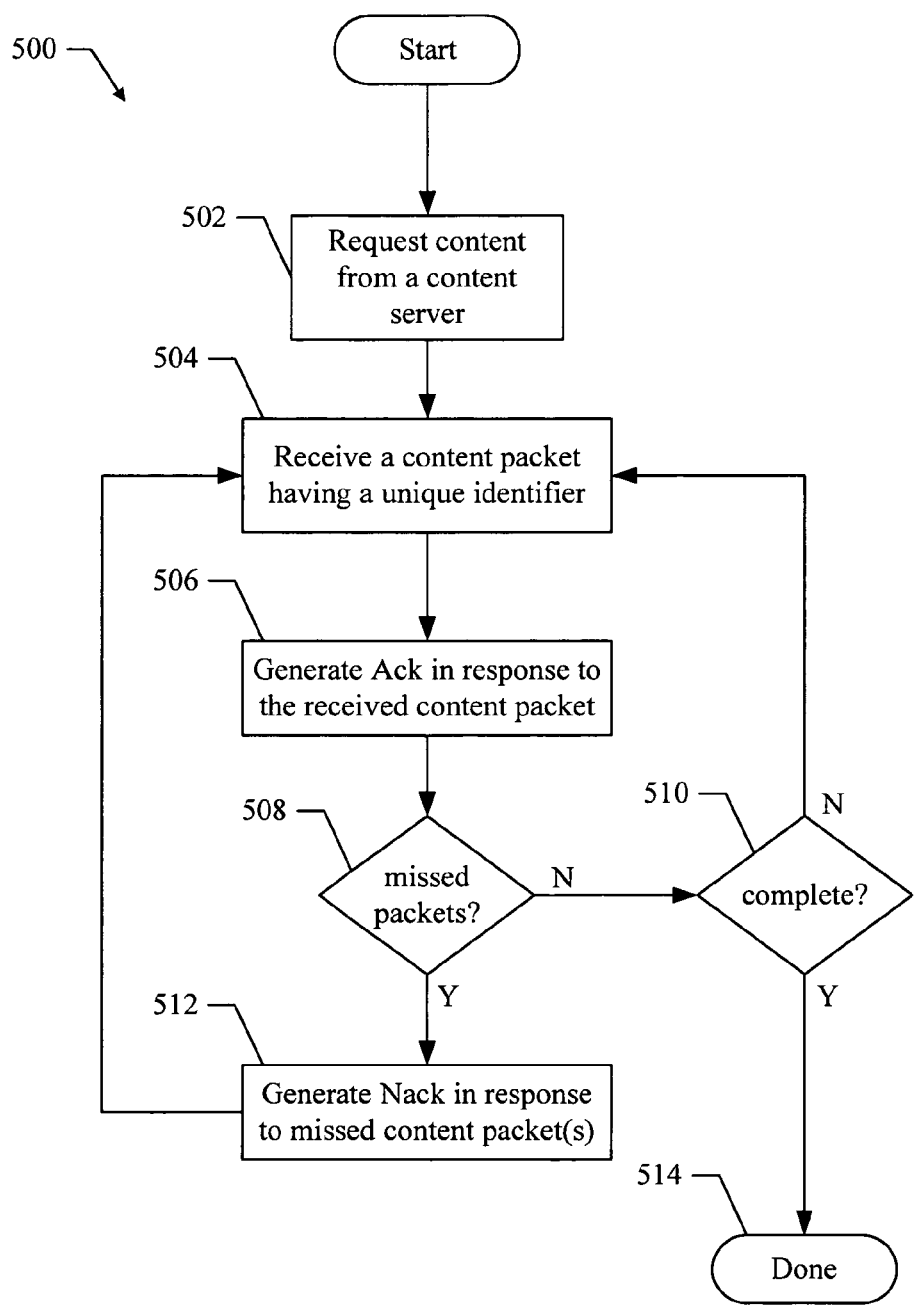
FIG. 5 shows one embodiment of a method for operating a mobile terminal in one embodiment of a file transfer system.

FIG. 5 shows one embodiment of a method 500 for operating a terminal in one embodiment of a file transfer system. For clarity, the method 500 will be described with reference to the terminal 400 shown in FIG. 4. In one or more embodiments, the processing logic 402 executes program instructions to perform the functions described below.

At block 502, the terminal request content from a server on a data network. For example, the processing logic 402 sends a request for content to the server via the transceiver logic 408.

At block 504, the terminal begins to receive the requested content from the server in the form of content packets. For example, the content packets are transmitted the server over a data network and received at the transceiver logic 408. The processing logic 402 operates to store the received content packet in the memory 404.

At block 506, an Ack signal is generated in response to the received content packet. For example, in one embodiment, the processing logic 402 generates the Ack signal and transmits the Ack signal to the server via the transceiver logic 408.

At block 508, a test is performed to determine if any content packets have not been received at the terminal. For example, in one embodiment, the processing logic 402 processes the unique packet identifiers of one or more received content packets to determine if any content packets have not been received. For example, the unique packet identifiers are transmitted from the server in a pre-defined sequence so that the processing logic 402 may determine which packets, if any, have not been received based on the identifiers of the received packets. If any packets have not been received, the method proceeds to block 512. If there are no missing packets the method proceeds to block 510.

At block 510, a test is performed to determine if all of the content packets associated with the content have been received at the terminal. For example, the processing logic 402 determines if the all the content packets have been received. If there are more content packets to be received, the method proceeds to block 504 where additional packets are received. If all the content packets have been received at the terminal, the method ends at block 514.

At block 512, a Nack signal is generated and transmitted to the server to indicate that one or more content packets have not been received. For example, in one embodiment, the processing logic 402 generates the Nack signal and transmits it to the server via the transceiver logic 408. The method then proceeds to block 504 where additional content packets are received. For example, the server may re-transmit missing content packets in response to the Nack signal.

It should be noted that the method 500 illustrates just one embodiment and that changes, additions, combinations, or rearrangements of the functional elements may be made without deviating from the scope of the described embodiments. For example, at blocks 506 and 512, the terminal may operate to store multiple Acks and/or Nack before transmitting them to the server in a single transmission, which operates to conserve network bandwidth.

Figure 6:
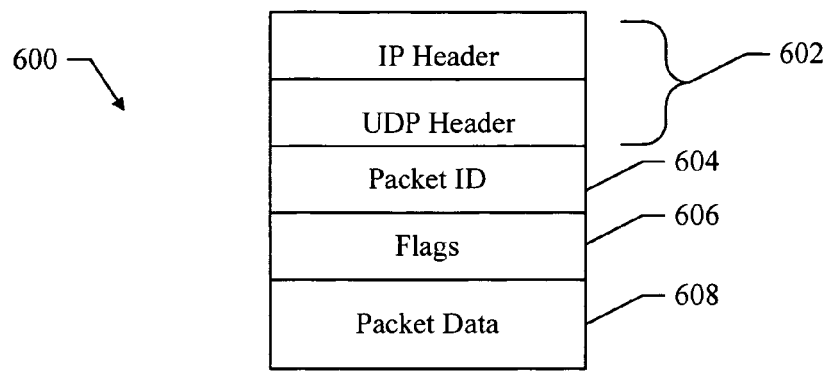
FIG. 6 shows one embodiment of a data structure for use by a server to transmit content packets to a terminal in one embodiment of a file transfer system.

FIG. 6 shows one embodiment of a data structure 600 for use by a server to transmit content packets to a terminal in one embodiment of a file transfer system. The structure 600 comprises header information 602, packet identifier 604, flags 606, and content packet data 608. The packet identifier 604 is a unique identifier that is part of a predefined sequence of identifiers. Thus, the packet data 608 is associated with the identifier 604 during the transmission process so that the receiving terminal may operate to acknowledge the receipt of the packet data or indicate that the packet has not been received.

Figure 7:
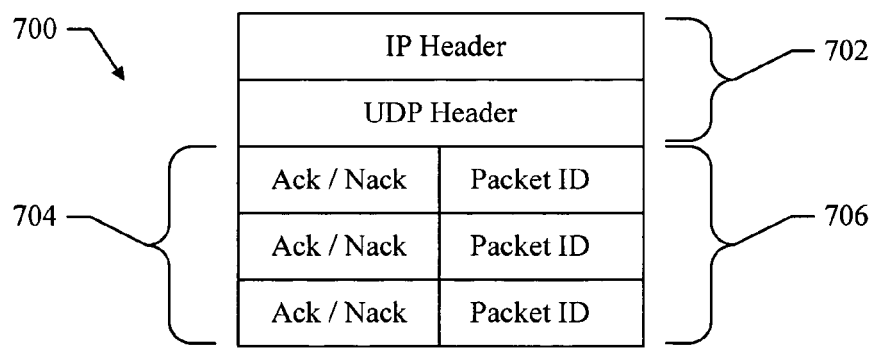
FIG. 7 shows one embodiment of a data structure for use by a terminal to transmit acknowledgment signals to a content server in one embodiment of a file transfer system.

FIG. 7 shows one embodiment of a data structure 700 for use by a terminal to transmit Acks and/or Nacks to a content server in one embodiment of a file transfer system. The data structure 700 comprises header information 702, Ack/Nack indicators 704 and corresponding packet identifiers 706. In one embodiment, a terminal assembles one or more of the Ack/Nack indicators 704 to indicate the receipt or non-receipt of the associated packet identifiers 706. Thus, using the structure 700 a terminal is able to transmit one or more (including any combination) of Ack/Nacks to a content server in response to the transmission of content packets.

Accordingly, while one or more embodiments of a file transfer system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

I claim:

1. A computer-implemented method for transmitting content in a data network, the method comprising:
    transmitting content to a mobile terminal via the data network at a selected transmission rate;
    receiving one or more acknowledgment signals;
    determining an estimation duration based on a preferred performance for estimating a network delivery rate;
    estimating a network delivery rate, which indicates a speed at which data was delivered to the mobile terminal, based on the selected transmission rate and a change in a number of unacknowledged packets during the estimation duration and a size of the unacknowledged packets, wherein:
        the number of unacknowledged packets is determined from one or more positive acknowledgment signals among the one or more acknowledgment signals received during the estimation duration; and
        the estimation duration is large enough such that the estimated network delivery rate is non-negative; and
    adjusting the selected transmission rate of the content based on the estimated network delivery rate that indicates the speed at which data was delivered to the mobile terminal.

2. The method of claim 1, wherein the content comprises one or more content packets, and wherein transmitting content to the mobile terminal comprises:
    assigning unique packet identifiers to the one or more content packets; and
    transmitting the one or more content packets at the selected transmission rate.

3. The method of claim 2, wherein receiving one or more acknowledgement signals comprises:
    receiving an Ack signal for a content packet that has been received; and
    receiving a Nack signal for a content packet that has not been received.

4. The method of claim 3, wherein estimating the network delivery rate comprises estimating at one of a selected interval and a periodic interval the network delivery rate from received Ack signals.

5. The method of claim 3, further comprising re-transmitting a selected content packet in response to receiving one or more Nack signals for the selected content packet.

6. The method of claim 3, further comprising:
    re-transmitting a selected content packet in response to receiving a selected number of Nack signals for the selected content packet.

7. The method of claim 1, wherein adjusting the selected transmission rate of the content comprises decreasing the selected transmission rate when the selected transmission rate is higher than the estimated network delivery rate.

8. The method of claim 1, wherein adjusting the selected transmission rate of the content comprises increasing the selected transmission rate when the estimated network delivery rate is substantially the same as the selected transmission rate.

9. The method of claim 1, further comprising:
receiving one or more Nack signals for content packets that have not been received,
wherein the selected transmission rate is not adjusted in response to any of the received one or more Nack signals.

10. The method of claim 1, further comprising:
receiving one or more Nack signals for a content packet that has not been received, wherein the number of unacknowledged packets during the estimation duration does not change in response to the received one or more Nack signals.

11. The method of claim 1, wherein receiving one or more acknowledgement signals comprising:
receiving a data structure comprising header information and a plurality of acknowledgment signals, wherein each of the plurality of acknowledgment signals includes one of an Ack signal and a Nack signal, and a corresponding unique packet identifier.

12. An apparatus for transmitting content in a data network, the apparatus comprising:
transceiver logic configured to transmit content to a mobile terminal via the data network at a selected transmission rate and to receive one or more acknowledgment signals;
estimator logic configured to:
determine an estimation duration based on a preferred performance for estimating a network delivery rate; and
estimate a network delivery rate, which indicates a speed at which data was delivered to the mobile terminal, based on the selected transmission rate and a change in a number of unacknowledged packets during the estimation duration and a size of the unacknowledged packets, wherein:
the number of unacknowledged packets is determined from one or more positive acknowledgment signals among the one or more acknowledgment signals received during the estimation duration; and
the estimation duration is large enough such that the estimated network delivery rate is non-negative; and
rate controller logic configured to adjust the selected transmission rate of the content based on the estimated network delivery rate that indicates the speed at which data was delivered to the mobile terminal.

13. The apparatus of claim 12, wherein the content comprises one or more content packets, and the transceiver logic comprises:
logic to assign unique packet identifiers to the one or more content packets; and
logic to transmit the one or more content packets at the selected transmission rate.

14. The apparatus of claim 13, wherein the transceiver logic comprises:
logic to receive an Ack signal for a content packet that has been received; and
logic to receive a Nack signal for a content packet that has not been received.

15. The apparatus of claim 14, wherein the estimator logic comprises logic to estimate at one of a selected interval and a periodic interval the network delivery rate from received Ack signals.

16. The apparatus of claim 14, further comprising logic to re-transmit a selected content packet in response to receiving one or more Nack signals for the selected content packet.

17. The apparatus of claim 14, further comprising processing logic that operates to re-transmit a selected content packet in response to receiving a selected number of Nack signals for the selected content packet.

18. The apparatus of claim 12, wherein the rate controller logic operates to decrease the selected transmission rate when the selected transmission rate is higher than the estimated network delivery rate.

19. The apparatus of claim 12, wherein the rate controller logic operates to increase the selected transmission rate when the estimated network delivery rate is substantially the same as the selected transmission rate.

20. An apparatus for transmitting content in a data network, the apparatus comprising:
means for transmitting content to a mobile terminal via the data network at a selected transmission rate;
means for receiving one or more acknowledgment signals;
means for determining an estimation duration based on a preferred performance for estimating a network delivery rate;
means for estimating a network delivery rate, which indicates a speed at which data was delivered to the mobile terminal, based on the selected transmission rate and a change in a number of unacknowledged packets during the estimation duration and a size of the unacknowledged packets, wherein:
the number of unacknowledged packets is determined from one or more positive acknowledgment signals among the one or more acknowledgment signals received during the estimation duration; and
the estimation duration is large enough such that the estimated network delivery rate is non-negative; and
means for adjusting the selected transmission rate of the content based on the estimated network delivery rate that indicates the speed at which data was delivered to the mobile terminal.

21. The apparatus of claim 20, wherein the content comprises one or more content packets, and the means for transmitting comprises:
means for assigning unique packet identifiers to the one or more content packets; and
means for transmitting the one or more content packets at the selected transmission rate.

22. The apparatus of claim 21, wherein the means for receiving comprises:
means for receiving an Ack signal for a content packet that has been received; and
means for receiving a Nack signal for a content packet that has not been received.

23. The apparatus of claim 22, wherein the means for estimating comprises means for estimating at one of a selected interval and a periodic interval the network delivery rate from received Ack signals.

24. The apparatus of claim 22, further comprising means for re-transmitting a selected content packet in response to receiving one or more Nack signals for the selected content packet.

25. The apparatus of claim 22, further comprising:
means for re-transmitting a selected content packet in response to receiving a selected number of Nack signals for the selected content packet.

26. The apparatus of claim 20, wherein the means for adjusting comprises means for decreasing the selected transmission rate when the selected transmission rate is higher than the estimated network delivery rate.

27. The apparatus of claim 20, wherein the means for adjusting comprises means for increasing the selected transmission rate when the estimated network delivery rate is substantially the same as the selected transmission rate.

28. A non-transitory computer-readable medium comprising instructions, which when executed by a processor, operate to transmit content in a data network, the non-transitory computer-readable medium comprising:
instructions for transmitting content to a mobile terminal via the data network at a selected transmission rate;
instructions for receiving one or more acknowledgment signals;
instructions for determining an estimation duration based on a preferred performance for estimating a network delivery rate;
instructions for estimating a network delivery rate, which indicates a speed at which data was delivered to the mobile terminal, based on the selected transmission rate and a change in a number of unacknowledged packets during the estimation duration and a size of the unacknowledged packets, wherein:
the number of unacknowledged packets is determined from one or more positive acknowledgment signals among the one or more acknowledgment signals received during the estimation duration; and
the estimation duration is large enough such that the estimated network delivery rate is non-negative; and
instructions for adjusting the selected transmission rate of the content based on the estimated network delivery rate that indicates the speed at which data was delivered to the mobile terminal.

29. The non-transitory computer-readable medium of claim 28, wherein the content comprises one or more content packets, and the instructions for transmitting comprise:
instructions for assigning unique packet identifiers to the one or more content packets; and
instructions for transmitting the one or more content packets at the selected transmission rate.

30. The non-transitory computer-readable medium of claim 29, wherein the instructions for receiving comprise:
instructions for receiving an Ack signal for a content packet that has been received; and
instructions for receiving a Nack signal for a content packet that has not been received.

31. The non-transitory computer-readable medium of claim 30, wherein the instructions for estimating comprise instructions for estimating at one of a selected interval and a periodic interval the network delivery rate from received Ack signals.

32. The non-transitory computer-readable medium of claim 30, further comprising instructions for re-transmitting a selected content packet in response to receiving one or more Nack signals for the selected content packet.

33. The non-transitory computer-readable medium of claim 30, further comprising:
instructions for re-transmitting a selected content packet in response to receiving a selected number of Nack signals for the selected content packet.

34. The non-transitory computer-readable medium of claim 28, wherein the instructions for adjusting comprise instructions for decreasing the selected transmission rate when the selected transmission rate is higher than the estimated network delivery rate.

35. The non-transitory computer-readable medium of claim 28, wherein the instructions for adjusting comprise instructions for increasing the selected transmission rate when the estimated network delivery rate is substantially the same as the selected transmission rate.

36. A processor comprising estimator logic and rate controller logic for transmitting content in a data network, the processor further comprising computer code to perform a method comprising:
transmitting content to a mobile terminal via the data network at a selected transmission rate;
receiving one or more acknowledgment signals;
determining an estimation duration based on a preferred performance for estimating a network delivery rate;
estimating a network delivery rate, which indicates a speed at which data was delivered to the mobile terminal, based on the selected transmission rate and a change in a number of unacknowledged packets during the estimation duration and a size of the unacknowledged packets, wherein:
the number of unacknowledged packets is determined from one or more positive acknowledgment signals among the one or more acknowledgment signals received during the estimation duration; and
the estimation duration is large enough such that the estimated network delivery rate is non-negative; and
adjusting the selected transmission rate of the content based on the estimated network delivery rate that indicates the speed at which data was delivered to the mobile terminal.

37. The method of claim 36, wherein the content comprises one or more content packets, and wherein transmitting content to a mobile terminal comprises:
assigning unique packet identifiers to the one or more content packets; and
transmitting the one or more content packets at the selected transmission rate.

38. The method of claim 37, wherein receiving one or more acknowledgement signals comprises:
receiving an Ack signal for a content packet that has been received; and
receiving a Nack signal for a content packet that has not been received.

39. The method of claim 38, wherein estimating the network delivery rate comprises estimating at one of a selected interval and a periodic interval the network delivery rate from received Ack signals.

40. The method of claim 38, further comprising re-transmitting a selected content packet in response to receiving one or more Nack signals for the selected content packet.

41. The method of claim 38, further comprising:
re-transmitting a selected content packet in response to receiving a selected number of Nack signals for the selected content packet.

42. The method of claim 36, wherein adjusting the selected transmission rate comprises decreasing the selected transmission rate when the selected transmission rate is higher than the estimated network delivery rate.

43. The method of claim 36, wherein adjusting the selected transmission rate comprises increasing the selected transmission rate when the estimated network delivery rate is substantially the same as the selected transmission rate.

\* \* \* \* \*